United States Patent
Zhao et al.

(10) Patent No.: US 12,273,473 B2
(45) Date of Patent: Apr. 8, 2025

(54) BACK COVER AND ELECTRONIC ASSEMBLY

(71) Applicant: ASUS GLOBAL PTE. LTD., Singapore (SG)

(72) Inventors: Ya Zhao, Singapore (SG); Fen Huang, Singapore (SG); Lei Sun, Singapore (SG)

(73) Assignee: ASUS GLOBAL PTE. LTD., Singapore (SG)

( * ) Notice: Subject to any disclaimer, the term of this patent is extended or adjusted under 35 U.S.C. 154(b) by 441 days.

(21) Appl. No.: 17/735,121

(22) Filed: May 3, 2022

(65) Prior Publication Data
US 2022/0368783 A1   Nov. 17, 2022

(30) Foreign Application Priority Data
May 11, 2021   (CN) .......................... 202110512869.4

(51) Int. Cl.
*H04M 1/02* (2006.01)
*H04N 23/57* (2023.01)

(52) U.S. Cl.
CPC .......... *H04M 1/0202* (2013.01); *H04N 23/57* (2023.01)

(58) Field of Classification Search
CPC .... H04M 1/02; H04M 1/0202; H04M 1/0206; H04M 1/0208; H04N 23/57
See application file for complete search history.

(56) References Cited

U.S. PATENT DOCUMENTS

| | | | |
|---|---|---|---|
| 2019/0163242 A1* | 5/2019 | Zeng | G06F 1/188 |
| 2020/0296191 A1 | 9/2020 | Zeng et al. | |
| 2022/0174138 A1* | 6/2022 | Lee | H04M 1/0264 |
| 2022/0342285 A1* | 10/2022 | Li | H04N 23/57 |
| 2024/0118593 A1* | 4/2024 | Jakubowski | F16M 11/041 |

FOREIGN PATENT DOCUMENTS

| | | |
|---|---|---|
| CN | 104580864 | 4/2015 |
| CN | 205512956 | 8/2016 |
| CN | 107454227 | 12/2017 |
| CN | 207354366 | 5/2018 |
| CN | 110083197 | 8/2019 |
| JP | 6364527 | 7/2018 |

* cited by examiner

*Primary Examiner* — Wayne H Cai
(74) *Attorney, Agent, or Firm* — JCIPRNET

(57) ABSTRACT

Provided is a back cover. The back cover includes a body, a movable member, and a first to-be-sensed member. The body includes a notch. The movable member is movably disposed on the body. The first to-be-sensed member is disposed on the movable member. When the movable member is located in a first position relative to the body, a projection of the movable member onto the body is located outside the notch. When the movable member moves to a second position relative to the body, the movable member covers at least part of the notch. Further provided is an electronic assembly having the foregoing back cover. The movable member of the back cover is movable relative to the body, to be located outside the notch or cover at least part of the notch. When the back cover is applied on the electronic device, the movable member is configured to stop an image acquisition assembly of the electronic device to prevent the image acquisition assembly from being accidentally thrown out.

7 Claims, 8 Drawing Sheets

BACK COVER AND ELECTRONIC ASSEMBLY

CROSS-REFERENCE TO RELATED APPLICATION

This application claims the priority benefit of Chinese application serial No. 202110512869.4, filed on May 11, 2021. The entirety of the above-mentioned patent application is hereby incorporated by reference herein and made a part of the specification.

BACKGROUND OF THE INVENTION

Field of the Invention

The disclosure relates to a back cover and an electronic assembly, and in particular, to a back cover with a movable member and an electronic assembly with the back cover.

Description of the Related Art

At present, mobile phones with reversible image acquisition assemblies have appeared on the market, and the image acquisition assembly is turned from a back side to a front side of the mobile phone to facilitate selfie. However, when a user shakes such a mobile phone with great force, it is easy to throw the image acquisition assembly away from the original initial position (in an embodiment, a receiving position on the back of the mobile phone), and an included angle is formed with the body of the mobile phone, so that the protruding image acquisition assembly is easily damaged due to collisions, which is likely to cause inconvenience in carrying and using.

BRIEF SUMMARY OF THE INVENTION

According to the first aspect, a back cover is provided. The back cover includes a body, a movable member, and a first to-be-sensed member. The body includes a notch. The movable member is movably disposed on the body. The first to-be-sensed member is disposed on the movable member. When the movable member is located in a first position relative to the body, a projection of the movable member onto the body is located outside the notch. When the movable member moves to a second position relative to the body, the movable member covers at least part of the notch.

According to the second aspect, an electronic assembly is provided. The electronic assembly includes an electronic device and a back cover. The electronic device includes a controller, an image acquisition assembly, and a first sensor. The image acquisition assembly is electrically connected to the controller. The first sensor is located adjacent to the image acquisition assembly and is electrically connected to the controller. The back cover is detachably disposed on the electronic device, and includes a body, a movable member, and a first to-be-sensed member. The body includes a notch corresponding to the image acquisition assembly. The movable member is movably disposed on the body. The first to-be-sensed member is disposed on the movable member. When the movable member is located in a first position relative to the body, the image acquisition assembly is exposed from the notch, and a projection of the movable member onto the body is located outside the notch, so that the image acquisition assembly is adapted to flip. When the movable member moves to a second position relative to the body, the movable member covers at least part of the notch, to limit a position of the image acquisition assembly, so as to prevent the image acquisition assembly from being flipped. When the movable member is located in at least one of the first position and the second position relative to the body, the first sensor senses the first to-be-sensed member.

DETAILED DESCRIPTION OF THE EMBODIMENTS

Figure 1:
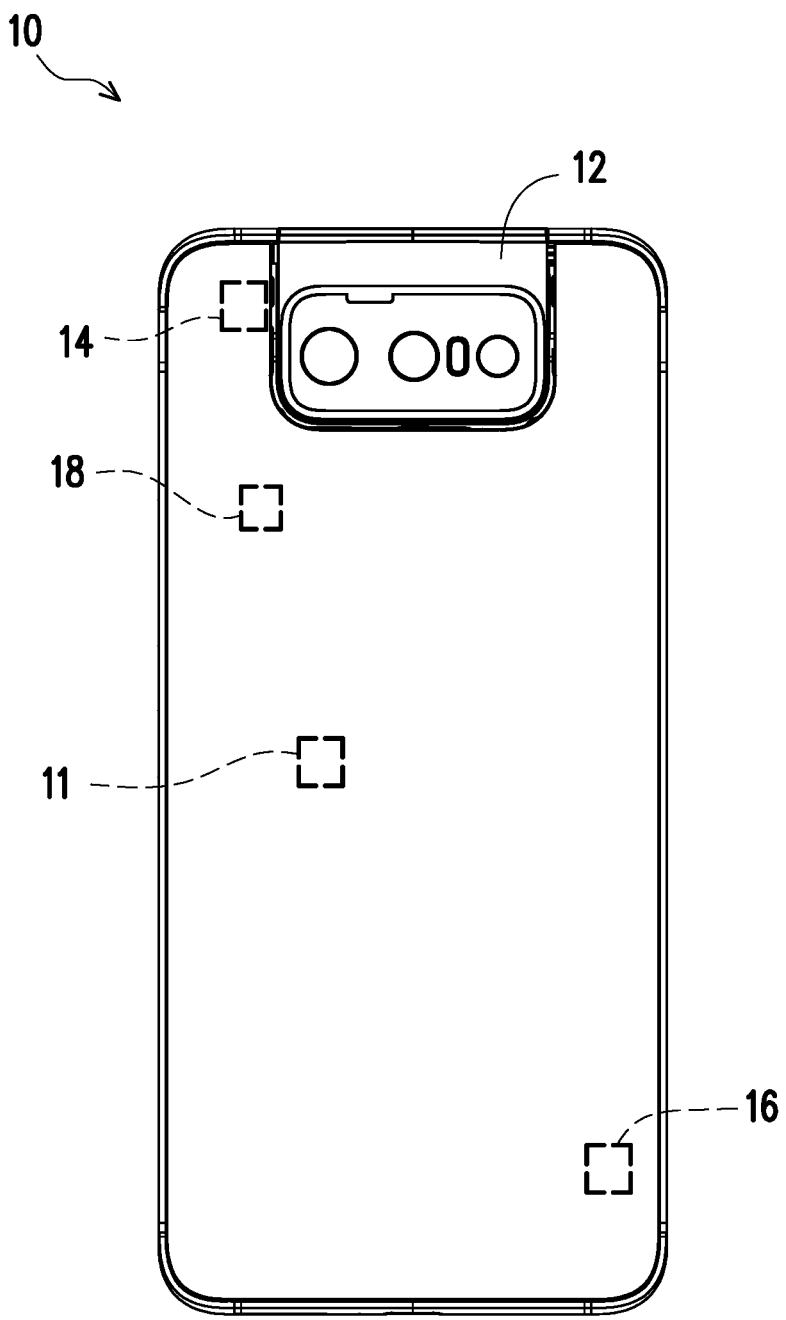
FIG. 1 is a schematic front view of an electronic device according to an embodiment of the disclosure.

References will now be made in detail to exemplary embodiments of the disclosure, and examples of the exemplary embodiments will be described in the accompanying drawings. Whenever possible, the same element symbols are used in the drawings and descriptions to indicate the same or similar parts.

Figure 2:
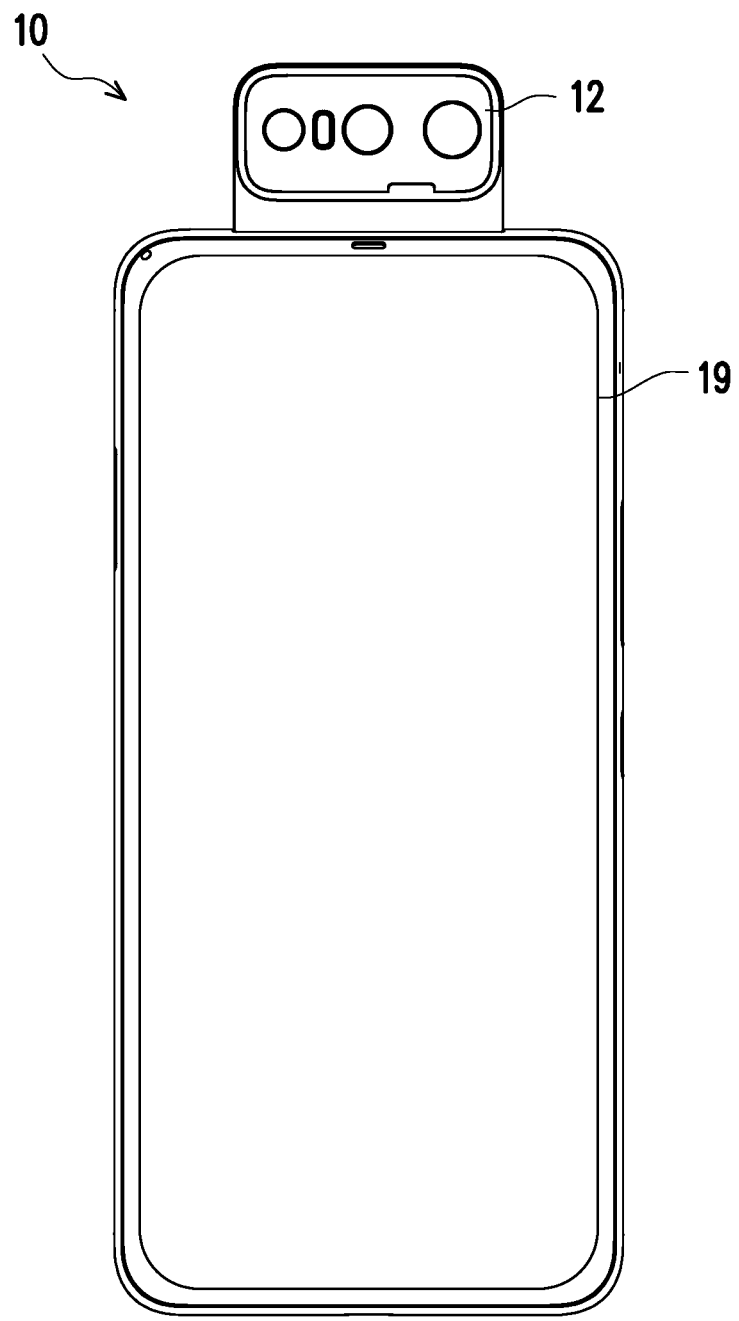
FIG. 2 is a schematic front view of the electronic device of FIG. 1.

Referring to FIG. 1 and FIG. 2, in this embodiment, an electronic device 10 is a mobile phone by way of example. However, in other embodiments, the electronic device 10 is also a tablet computer or other devices for recording a video, and a type of the electronic device 10 is not limited thereto.

The electronic device 10 includes a controller 11, an image acquisition assembly 12, and a first sensor 14. The image acquisition assembly 12 and the first sensor 14 are electrically connected to the controller 11, and are flipped, to the front of the electronic device 10 (as shown in FIG. 2), from a position accommodated on the back of the electronic device 10 (as shown in FIG. 1), so as to take a picture of the front or back of the electronic device 10 according to requirements of a user. As shown in FIG. 1, the first sensor 14 is located adjacent to the image acquisition assembly 12, and is electrically connected to the controller 11. In addition, as shown in FIG. 2, the front of the electronic device 10 further includes a screen 19 electrically connected to the controller 11 (FIG. 1).

Figure 3:
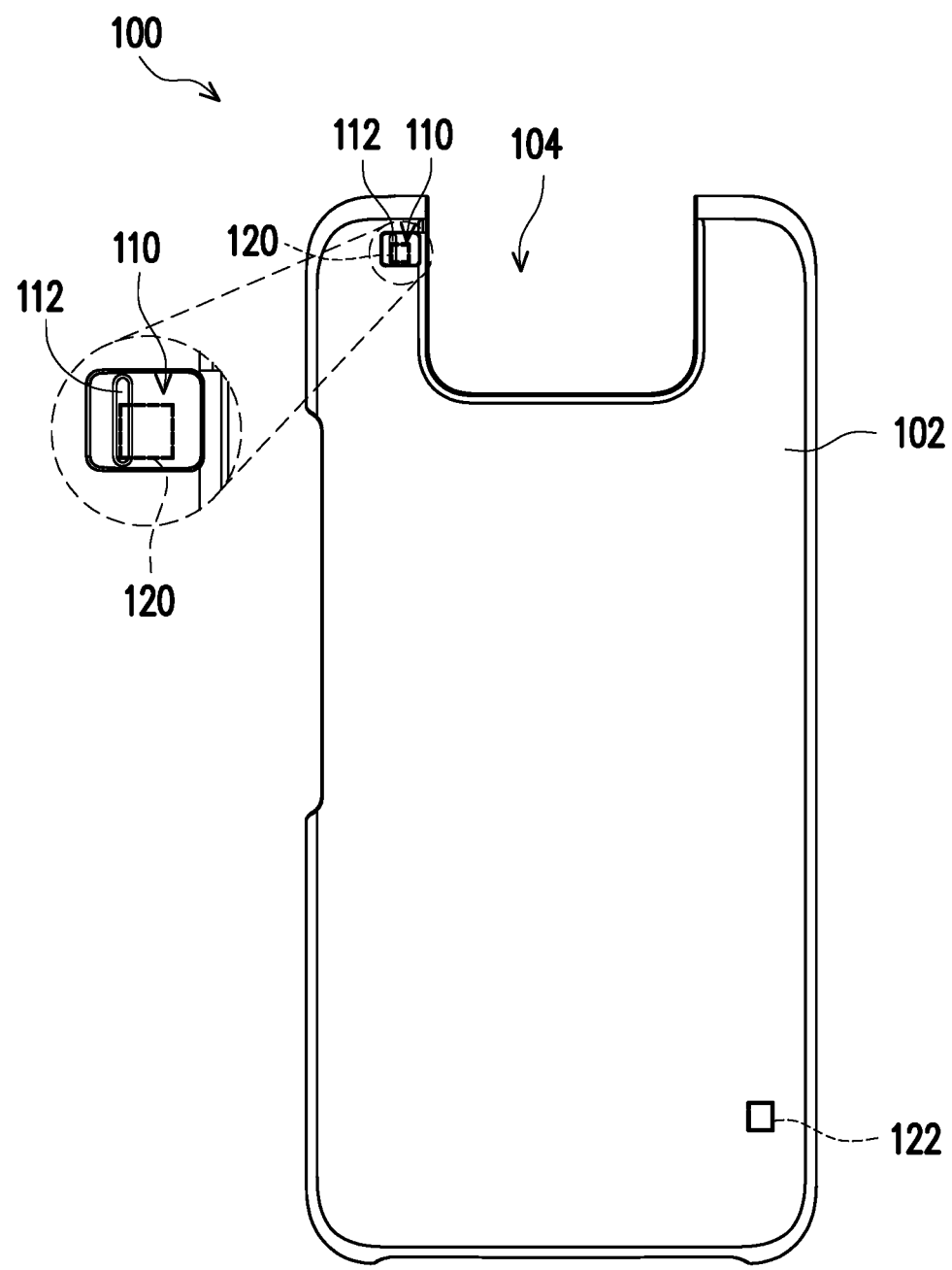
FIG. 3 is a schematic diagram of a back cover according to an embodiment of the disclosure.

Referring to FIG. 3, in this embodiment, the back cover 100 is, in an embodiment, a mobile phone back cover, but the back cover 100 is also a back cover of a tablet computer, and a type of the back cover is not limited thereto.

In this embodiment, the back cover 100 is removably disposed on the electronic device 10 (FIG. 1). The back cover 100 includes a body 102, a movable member 110, and a first to-be-sensed member 120. The body 102 of the back cover 100 covers the back of the electronic device 10 to protect the electronic device 10. The body 102 includes a notch 104. The notch 104 corresponds to the image acquisition assembly 12. Therefore, the image acquisition assembly 12 is exposed from the notch 104 and is flipped over the notch 104.

The movable member 110 is movably disposed on the body 102. In this embodiment, the movable member 110 includes a tenon. The tenon moves left and right relative to the body 102 and extends into the notch 104 (as shown in FIG. 5) or retracts from the notch 104 (as shown in FIG. 3 and FIG. 4), but the type and a direction of movement of the movable member 110 are not limited thereto.

The first to-be-sensed member 120 is disposed on the movable member 110 and moves along with the movable member 110. In this embodiment, the first sensor 14 (FIG. 1) of the electronic device 10 includes a three-axis Hall sensor, and the first to-be-sensed member 120 of the back cover 100 includes a magnet. The three-axis Hall sensor senses changes in magnetic flux in a three-axis direction to determine a position of the magnet. Definitely, in other embodiments, the first sensor 14 and the first to-be-sensed member 120 is also sensed by using other methods such as pressure, resistance, capacitance, optical changes, and the like. The types of the first sensor 14 and the first to-be-sensed member 120 are not limited thereto.

Figure 4:
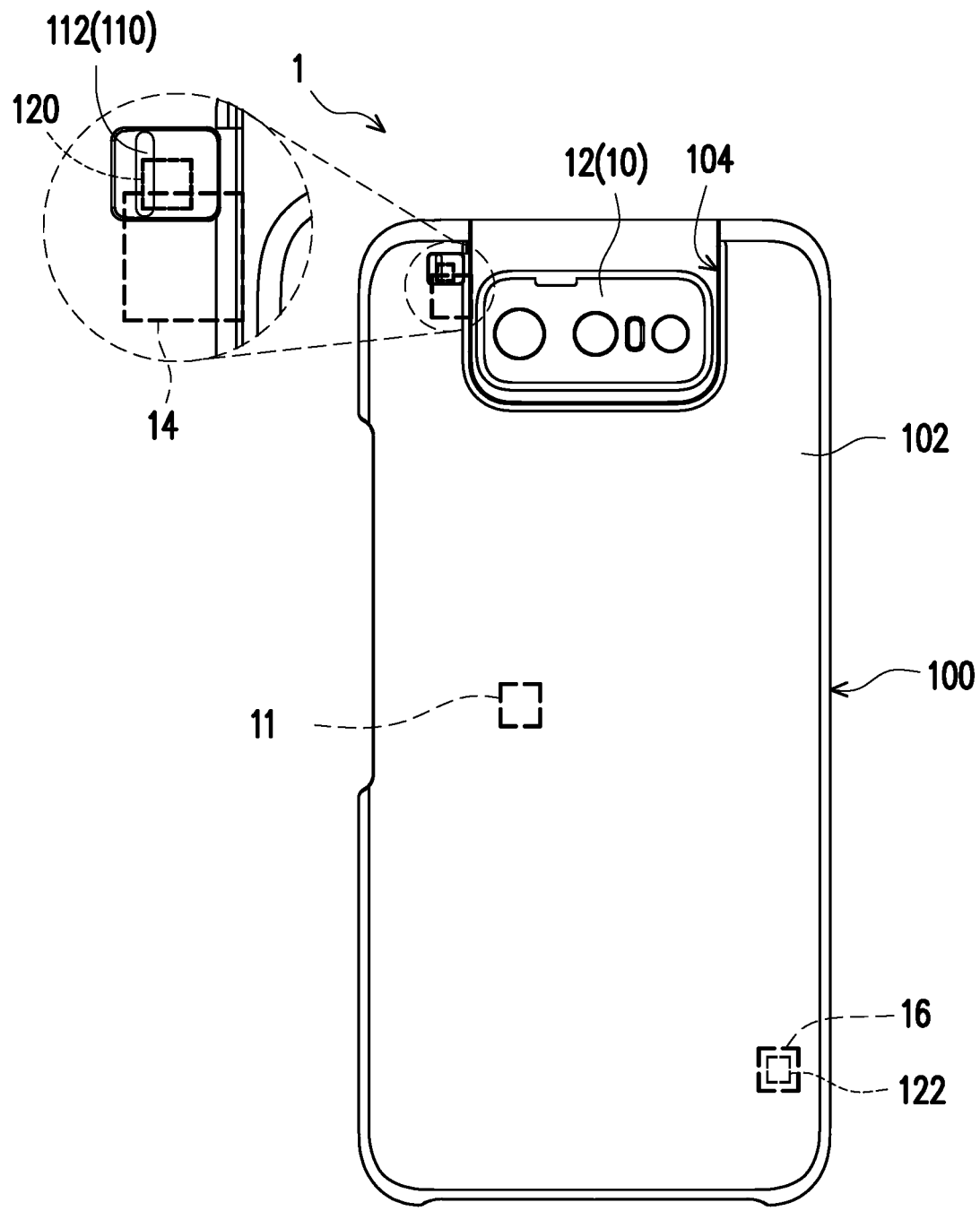
FIG. 4 is a schematic diagram of an electronic assembly according to an embodiment of the disclosure.
Figure 5:
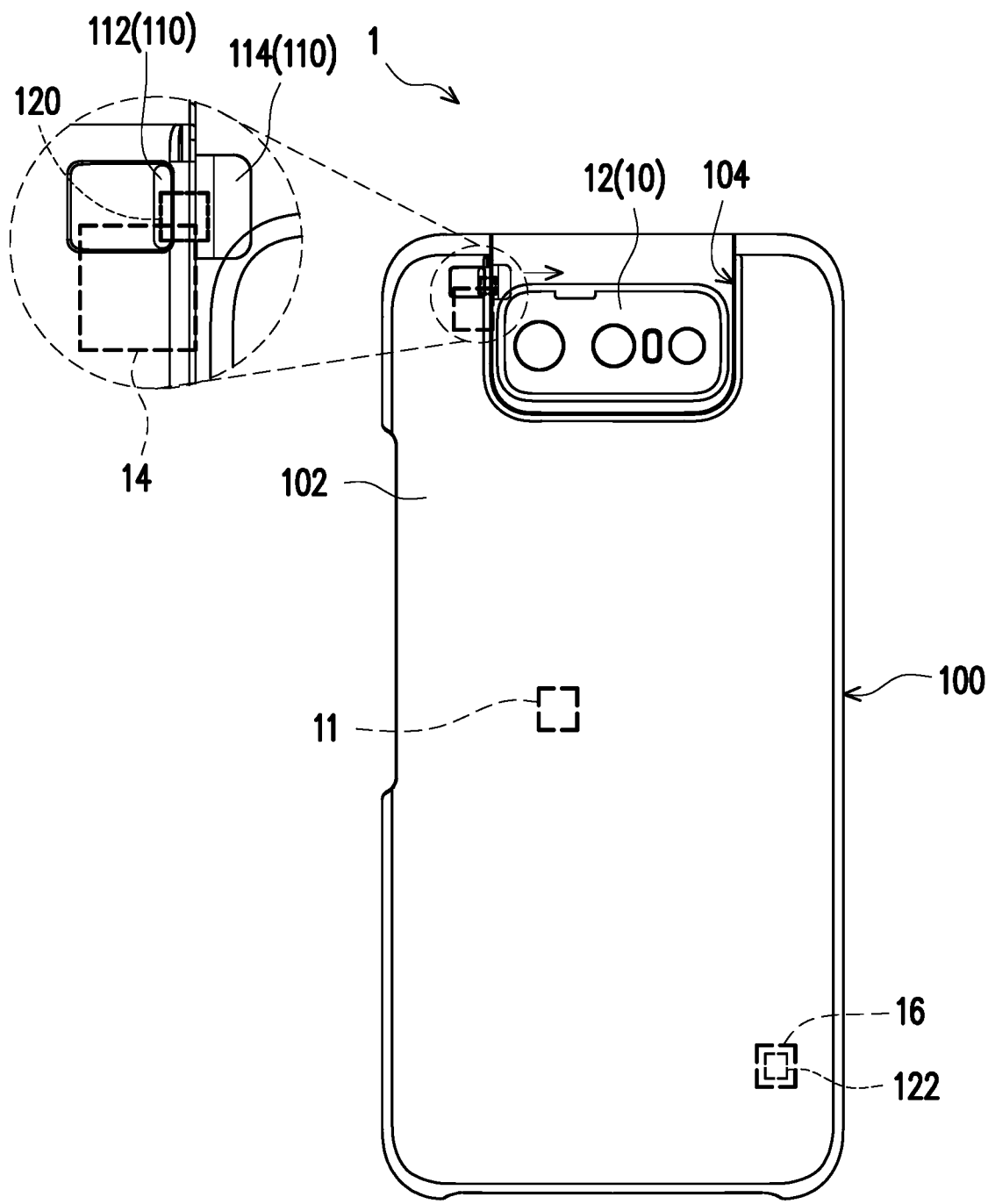
FIG. 5 is a schematic diagram of a movable member of the electronic assembly of FIG. 4 moving to a second position.

Referring to FIG. 4 and FIG. 5, in the electronic assembly 1 of this embodiment, in an embodiment, the back cover 100 of FIG. 3 is mounted on the electronic device 10 of FIG. 1. It is seen from FIG. 4 that when the movable member 110 is located in a first position P1 relative to the body 102, the image acquisition assembly 12 is exposed from the notch 104, and a projection of the movable member 110 onto the body 102 is located outside the notch 104, so that the image acquisition assembly 12 is flippable to the front of the electronic device 10. The image acquisition assembly 12 is rotated by a driving unit (in an embodiment, a motor not shown) in the electronic device 10, or is manually rotated by a user. The way that the image acquisition assembly 12 rotates is not limited thereto.

It is seen from FIG. 5 that when the user moves a toggle 112 of the movable member 110 in a direction of the notch 104, the movable member 110 moves to a second position P2 (in an embodiment, moves toward the right) relative to the body 102, and the movable member 110 covers at least part of the notch 104, to limit a position of the image acquisition assembly 12, so as to prevent the image acquisition assembly 12 from being flipped. Specifically, in this embodiment, an engaging portion 114 of the movable member 110 extends into the flipping track of the image acquisition assembly 12, so that the image acquisition assembly 12 is not flipped to a front side of the electronic device 10. In this way, the user does not need to worry about the situation that the image acquisition assembly 12 is to be thrown out and easily hit when the electronic device 10 is shaken with great force.

In addition, in this embodiment, it is seen from FIG. 4 and FIG. 5 that when the movable member 110 is located in the first position P1 and the second position P2 relative to the body 102, the position of the first to-be-sensed member 120 also changes accordingly because the first to-be-sensed member 120 is quite close to the first sensor 14 in the two positions and even partially coincides with the first sensor 14. Therefore, the first sensor 14 senses the first to-be-sensed member 120 located in different positions. The first sensor 14 transmits position information of the first to-be-sensed member 120 to the controller 11, and the controller 11 determines, based on the information, whether the movable member 110 is located in the first position P1 or the second position P2 relative to the body 102.

In an embodiment, the electronic device 10 further includes a gyroscope or an accelerometer (not shown) electrically connected to the controller 11. When the gyroscope or accelerometer senses that the electronic device 10 shakes greatly and the movable member 110 is located in the first position P1 (an unlocked position) relative to the body 102, the controller 11 transmits, to the screen 19, a warning message indicating that the movable member 110 is to be moved to the second position P2, to remind the user to move the movable member 110 to the second position P2, so as to prevent the image acquisition assembly 12 from being flipped, thus preventing the image acquisition assembly 12 from being flipped out and skewed by collisions or causing inconvenience in carrying or using.

In addition, when the image acquisition assembly 12 is to be flipped over and the movable member 110 is located in the second position P2 (a fixed position) or between the first position P1 and the second position P2 relative to the body 102, the controller 11 transmits, to the screen 19, a warning message indicating that the movable member 110 is to be moved to the first position P1, to remind the user to move the movable member 110 to the first position P1, so as to prevent the movable member 110 from restricting the image acquisition assembly 12. In an embodiment, when the user clicks the selfie mode in a shooting software or related application on the screen 19 of the electronic device 10 (FIG. 2), the controller 11 accordingly determines that the image acquisition assembly 12 is in a to-be-flipped state. However, when the movable member 110 is located in the second position P2 (a fixed position) or between the first position P1 and the second position P2 relative to the body 102, a warning message indicating that the movable member 110 is to be moved to the first position P1 is transmitted to the screen 19.

In addition, in this embodiment, the electronic device 10 further optionally includes a second sensor 16 electrically connected to the controller 11, and the back cover 100 further includes a second to-be-sensed member 122. The second to-be-sensed member is disposed on the body 102 and corresponds to the second sensor 16. When the back cover 100 is mounted on the electronic device 10, the second sensor 16 senses the second to-be-sensed member 122 and transmits the information to the controller 11. The controller 11 knows that the back cover 100 has been mounted on the electronic device 10. In other words, the second sensor 16 and the second to-be-sensed member 122 is used as a second guarantee for the controller 11 to determine whether the back cover 100 is mounted on the electronic device 10.

Definitely, when the back cover 100 is mounted on the electronic device 10, the first sensor 14 senses the first to-be-sensed member 120. In an embodiment, the second sensor 16 is omitted from the electronic device 10, and the second to-be-sensed member 122 is correspondingly omitted from the back cover 100.

In this embodiment, the second sensor 16 includes a Hall sensor, and the second to-be-sensed member 122 includes a magnet. However, the types of the second sensor 16 and the second to-be-sensed member 122 are not limited thereto. In other embodiments, the second sensor 16 and the second to-be-sensed member 122 is also sensed by using other methods such as pressure, resistance, capacitance, optical changes, and the like.

Figure 6:
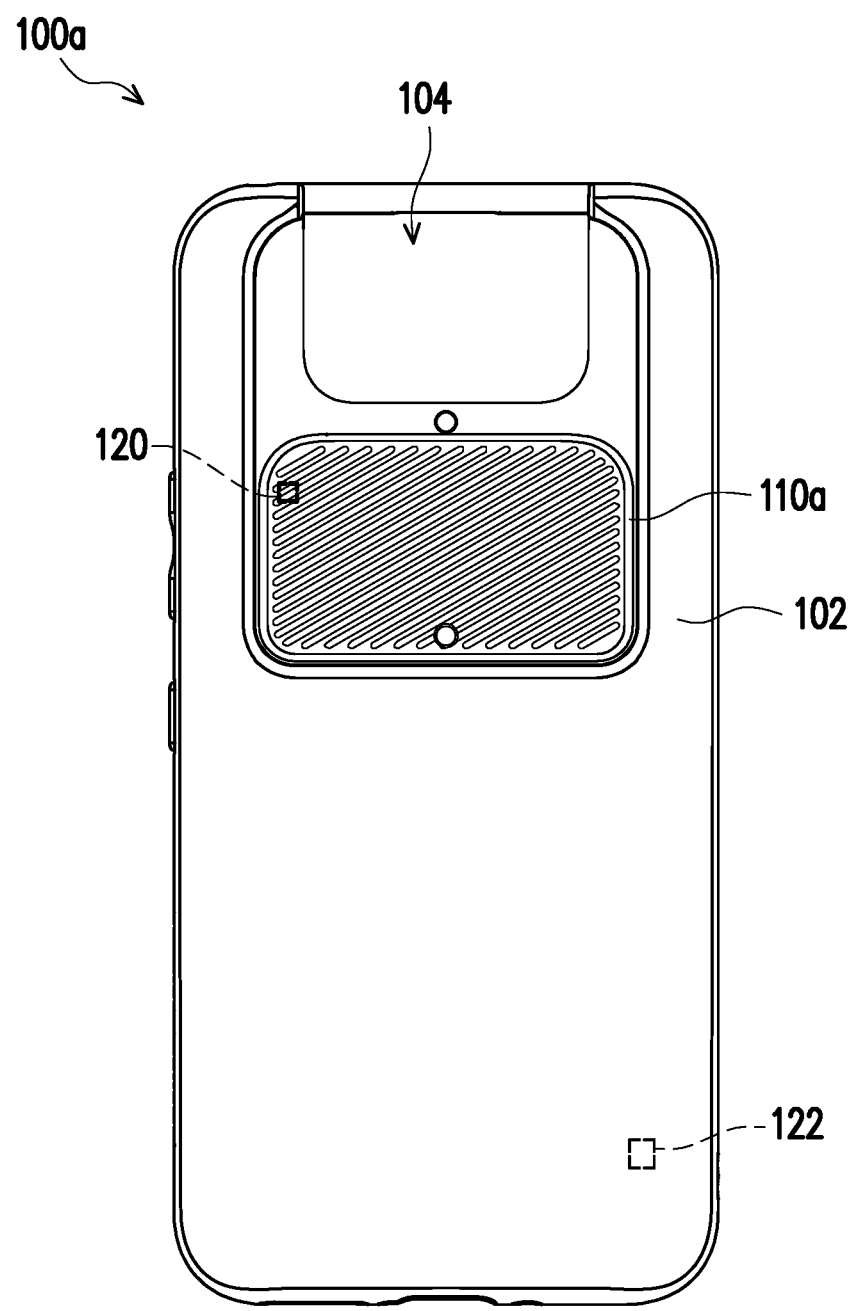
FIG. 6 is a schematic diagram of a back cover according to another embodiment of the disclosure.
Figure 7:
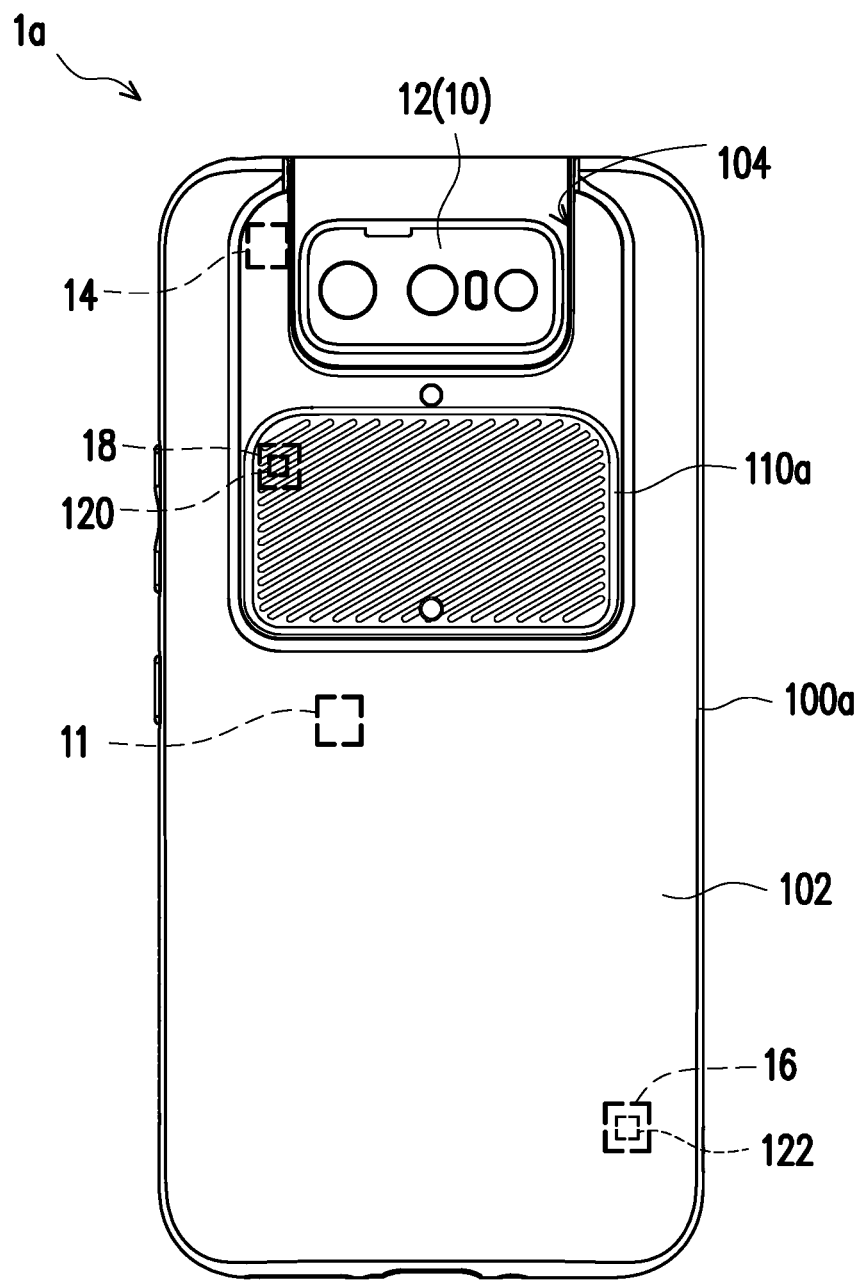
FIG. 7 is a schematic diagram of an electronic assembly according to another embodiment of the disclosure.

Referring to FIG. 6, a main difference between a back cover 100a of this embodiment and the back cover 100 of the previous embodiment is that, in this embodiment, a movable member 110a includes a cover body, the cover body moves up and down relative to the body 102 to cover and shield the entire notch 104 (FIG. 8) or expose the notch 104 (FIG. 6 and FIG. 7).

Figure 8:
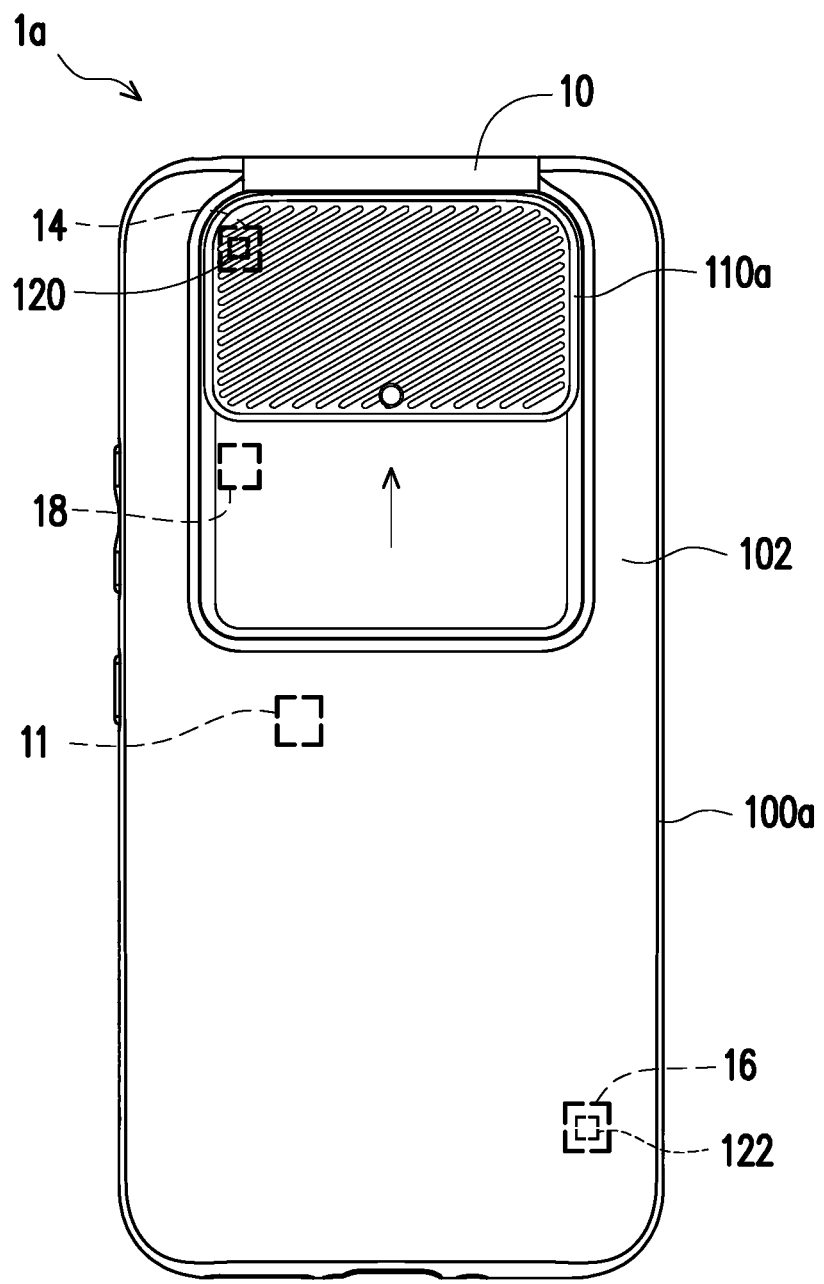
FIG. 8 is a schematic diagram of a movable member of the electronic assembly of FIG. 7 moving to a second position.

Referring to FIG. 7 and FIG. 8, in an electronic assembly 1a of this embodiment, the back cover 100a of FIG. 6 is mounted on the electronic device 10 of FIG. 1.

When the movable member 110a is located in the first position P1 relative to the body 102, the back cover 100a has not yet covered the notch 104 of the body 102, and the image acquisition assembly 12 of the electronic device 10 is exposed. The image acquisition assembly 12 is not shielded by the movable member 110a but flips to the front of the electronic device 10. The image acquisition assembly 12 is rotated by a driving unit (in an embodiment, a motor not shown) in the electronic device 10, or is manually rotated by a user.

In addition, in this embodiment, the electronic device 10 further includes a third sensor 18 electrically connected to the controller 11. The first sensor 14 and the third sensor 18 are located on a moving path of the movable member 110a. A sensing type of the third sensor 18 is the same as a sensing type of the first sensor 14 and is adapted to sense the first to-be-sensed member 120. In this embodiment, the first sensor 14 is a three-axis Hall sensor, the third sensor 18 is a Hall sensor, and the first to-be-sensed member 120 is a magnet, but types of the first sensor 14, the third sensor 18, and the first to-be-sensed member 120 are not limited thereto. When the movable member 110a is located in the second position P2 relative to the body 102, the third sensor 18 senses the first to-be-sensed member 120. Therefore, the controller 11 determines a position of the movable member 110a relative to the body 102 according to the information from the third sensor 18.

When the movable member 110a is located in the second position P2 relative to the body 102, the back cover 100a moves upward and covers the notch 104 of the body 102 to shield the image acquisition assembly 12. The image acquisition assembly 12 is shielded by the movable member 110a and does not flip to the front of the electronic device 10. Therefore, the position of the image acquisition assembly 12 is fixed. At this point, the first sensor 14 senses the first to-be-sensed member 120. Therefore, the controller 11 determines a position of the movable member 110a relative to the body 102 according to the information from the first sensor 14.

Similarly, when the gyroscope or accelerometer senses that the electronic device 10 shakes greatly and the movable member 110a is located in the first position P1 (an unlocked position) relative to the body 102, the controller 11 transmits, to the screen 19, a warning message indicating that the movable member 110a is to be moved to the second position P2 (FIG. 2), to remind the user to move the movable member 110a to the second position P2, so as to prevent the image acquisition assembly 12 from being flipped, thus preventing the image acquisition assembly 12 from being flipped out and skewed by collisions or causing inconvenience in carrying or using.

In addition, when the image acquisition assembly 12 is to be flipped over and the movable member 110a is located in the second position P2 (a fixed position) or between the first position P1 and the second position P2 relative to the body 102, the controller 11 transmits, to the screen 19, a warning message indicating that the movable member 110a is to be moved to the first position P1, to remind the user to move the movable member 110a to the first position P1, so as to prevent the movable member 110a from restricting the image acquisition assembly 12. In an embodiment, when the user clicks the selfie mode in a shooting software or related application on the screen 19 of the electronic device 10, the controller 11 accordingly determines that the image acquisition assembly 12 is in a to-be-flipped state, and a warning message indicating that the movable member 110a is to be moved to the first position P1 is transmitted to the screen 19.

In addition, the back cover 100a also includes a second to-be-sensed member 122. The second to-be-sensed member is disposed on the body 102 and corresponds to the second sensor 16. When the back cover 100a is mounted on the electronic device 10, the second sensor 16 senses the second to-be-sensed member 122 and transmits the information to the controller 11. The controller 11 knows that the back cover 100a has been mounted on the electronic device 10. Therefore, even if the movable member 110a is moved to a position between the first position P1 and the second position P2, causing the first to-be-sensed member 120 to be not aligned to the first sensor 14 or the third sensor 18, the electronic assembly 1a also causes, through the second sensor 16 and the second to-be-sensed member 122, the controller 11 to determine whether the back cover 100a is mounted on the electronic device 10.

It should be noted that, in this embodiment, the position of the first to-be-sensed member 120 of the back cover 100 of FIG. 3 is different from the position of the first to-be-sensed member 120 of the back cover 100a of FIG. 6. Specifically, the first to-be-sensed member 120 of the back cover 100 of FIG. 3 is located slightly above the first sensor 14, and the first to-be-sensed member 120 of the back cover 100a of FIG. 6 is located at the center of the first sensor 14. Definitely, in some embodiments, the position of the first to-be-sensed member 120 of the back cover 100 and the position of the first to-be-sensed member 120 of the back cover 100a are not limited thereto. Since the first sensor 14 is a three-axis Hall sensor, the first sensor 14 determines, through the position of the sensed first to-be-sensed member 120, whether the back cover 100 of FIG. 3 or the back cover 100a of FIG. 6 is mounted on the electronic device 10. Therefore, the electronic device 10 is applicable to both the back cover 100 of FIG. 3 and the back cover 100a of FIG. 6. The user purchases not only one of the back covers 100, 100a according to preferences.

In addition, the first sensor 14 further determines, by measuring the movement of the first to-be-sensed member 120 in different directions, whether the image acquisition assembly 12 is shielded by the movable member 110 or the movable member 110a. If the first sensor 14 senses that the first to-be-sensed member 120 of the back cover 100 of FIG. 3 moves to the right in FIG. 3, the controller 11 determines that the movable member 110 shields the image acquisition assembly 12. If the first sensor 14 senses that the first to-be-sensed member 120 of the back cover 100 of FIG. 3 moves to the left in FIG. 3, the controller 11 determines that the movable member 110 does not shield the image acquisition assembly 12.

When the first sensor 14 senses that the first to-be-sensed member 120 of the back cover 100a of FIG. 6 moves to an upper part in FIG. 6, the controller 11 determines that the movable member 110a shields the image acquisition assembly 12. If the first sensor 14 senses that the first to-be-sensed member 120 of the back cover 100a of FIG. 6 moves to a lower part of FIG. 6, the controller 11 determines that the movable member 110a does not shield the image acquisition assembly 12. However, if the movable member 110a in the back cover 100a of FIG. 6 does not move to a position covering the image acquisition assembly 12 (in an embodiment, when the movable member is located between the first position P1 and the second position P2), the first to-be-sensed member 120 does not determine whether the back cover 100a is sleeved on the electronic device 10. At this point, it is determined, depending on whether the second sensor 16 senses the second to-be-sensed member 122, whether the back cover 100a is mounted on the electronic device 10.

Moreover, as shown in FIG. 7, when the movable member 110a is located in the first position P1 relative to the body 102, the third sensor 18 senses the first to-be-sensed member 120. Therefore, the controller 11 determines, according to the third sensor 18 sensing the first to-be-sensed member 120, that the back cover 100a has been mounted on the electronic device 10, and the movable member 110a does not shield the image acquisition assembly 12 at this time.

In addition, in an embodiment, when the electronic device 10 of FIG. 1 is not equipped with the back cover 100, 100a for preventing the image acquisition assembly 12 from being flipped, at this point, the first sensor 14 does not sense the first to-be-sensed member 120, and the electronic device 10 uses its own gyroscope (not shown) or uses a 3-axis Hall sensor and a rotatable magnet (not shown) to detect an included angle between the image acquisition assembly 12 and the body of the electronic device 10. When the included angle exceeds a certain threshold, the controller 11 starts the motor to retract the image acquisition assembly 12. Alternatively, the electronic device 10 uses its own two accelerometers (not shown) to determine whether the electronic device 10 and the image acquisition assembly 12 are on the same plane. When the electronic device 10 and the image acquisition assembly 12 are not on the same plane, the controller 11 starts the motor to retract the image acquisition assembly 12. Therefore, the electronic device 10 also has a function of automatically retracting the image acquisition assembly 12.

Finally, it should be noted that the foregoing embodiments are merely used for describing the technical solutions of the disclosure, but are not intended to limit the disclosure. Although the disclosure is described in detail with reference to the foregoing embodiments, it should be appreciated by a person skilled in the art that, modifications are still made to the technical solutions recorded in the foregoing embodiments, or equivalent replacements are made to the part of all of the technical features; and these modifications or replacements will not cause the essence of corresponding technical solutions to depart from the scope of the technical solutions in the embodiments of the disclosure.

What is claimed is:

1. An electronic assembly, comprising:
    an electronic device, comprising:
        a controller;
        an image acquisition assembly, electrically connected to the controller; and
        a first sensor, located adjacent to the image acquisition assembly and electrically connected to the controller; and
    a back cover, removably disposed on the electronic device and comprising:
        a body, comprising a notch, wherein the notch corresponds to the image acquisition assembly;
        a movable member, movably disposed on the body; and
        a first to-be-sensed member, disposed on the movable member, wherein
    when the movable member is located in a first position relative to the body, the image acquisition assembly is exposed from the notch, and a projection of the movable member onto the body is located outside the notch, so that the image acquisition assembly is adapted to flip,
    when the movable member moves to a second position relative to the body, the movable member covers at least part of the notch, to limit a position of the image acquisition assembly, so as to prevent the image acquisition assembly from being flipped, and
    when the movable member is located in at least one of the first position and the second position relative to the body, the first sensor senses the first to-be-sensed member.

2. The electronic assembly according to claim 1, wherein the first sensor comprises a three-axis Hall sensor, the first to-be-sensed member comprises a magnet, and when the movable member is located in the first position and the second position relative to the body, the first sensor senses the first to-be-sensed member located in different positions.

3. The electronic assembly according to claim 1, wherein the electronic device further comprises a second sensor electrically connected to the controller, and the back cover further comprises a second to-be-sensed member disposed on the body and corresponding to the second sensor.

4. The electronic assembly according to claim 1, wherein the movable member comprises a tenon, and when the movable member is located in the second position relative to the body, the movable member covers part of the notch.

5. The electronic assembly according to claim 1, wherein the movable member comprises a cover body, and when the movable member is located in the second position relative to the body, the movable member covers the notch.

6. The electronic assembly according to claim 5, wherein the electronic device further comprises a third sensor electrically connected to the controller, when the movable member is located in the first position relative to the body, the first sensor senses the first to-be-sensed member, and when the movable member is located in the second position relative to the body, the third sensor senses the first to-be-sensed member.

7. The electronic assembly according to claim 1, wherein the electronic device further comprises a screen electrically connected to the controller, and when the image acquisition assembly is to be flipped, but the movable member is located in the second position or between the first position and the second position relative to the body, the controller transmits, to the screen, a warning message indicating that the movable member is to be moved to the first position.

* * * * *